March 15, 1949.  D. C. FERREIRA  2,464,494
HYDRAULIC VARIABLE SPEED TRANSMISSION
Filed April 9, 1946  2 Sheets-Sheet 1

INVENTOR.
David C. Ferreira
BY
Attorney

March 15, 1949.　　　D. C. FERREIRA　　　2,464,494
HYDRAULIC VARIABLE SPEED TRANSMISSION
Filed April 9, 1946　　　2 Sheets-Sheet 2

INVENTOR.
David C. Ferreira
BY
Charles R. Fay
Attorney

Patented Mar. 15, 1949

2,464,494

UNITED STATES PATENT OFFICE 2,464,494

HYDRAULIC VARIABLE-SPEED TRANSMISSION

David C. Ferreira, North Oxford, Mass.

Application April 9, 1946, Serial No. 660,785

2 Claims. (Cl. 74—786)

1

This invention relates to a variable speed power transmission operated by hydraulic means. Objects of the invention include the provision of a device of the type described comprising a housing, driven and driving shafts journalled therein, the driving shaft having teeth thereon in constant engagement with a pair of planetary gears which are journalled to rotate on their axes at spaced points on a plate secured to the driven shaft, said gears being in mesh with an internal ring gear, the latter being fixed to a gear rotatably mounted on the driving shaft; in combination with a hydraulic pump driven by the last named gear, said pump having a pipe within the housing to freely pump hydraulic fluid therein, said pipe being provided with a valve so as to selectively vary the operation of the pump whereby the planetary gears are selectively rotated on their own axes or revolved about the axis of the driven shaft so that the latter is either stopped or variably driven depending upon the valve.

Further objects of the invention include the provision of a hydraulic brake for one of the gears to insure stopping of the ring gear so as to force revolution of the planetary gears, said brake being automatically operable upon actuation of the valve.

Other objects and advantages of the invention will appear hereinafter.

Reference is to be had to the accompanying drawings, in which

Figure 1:
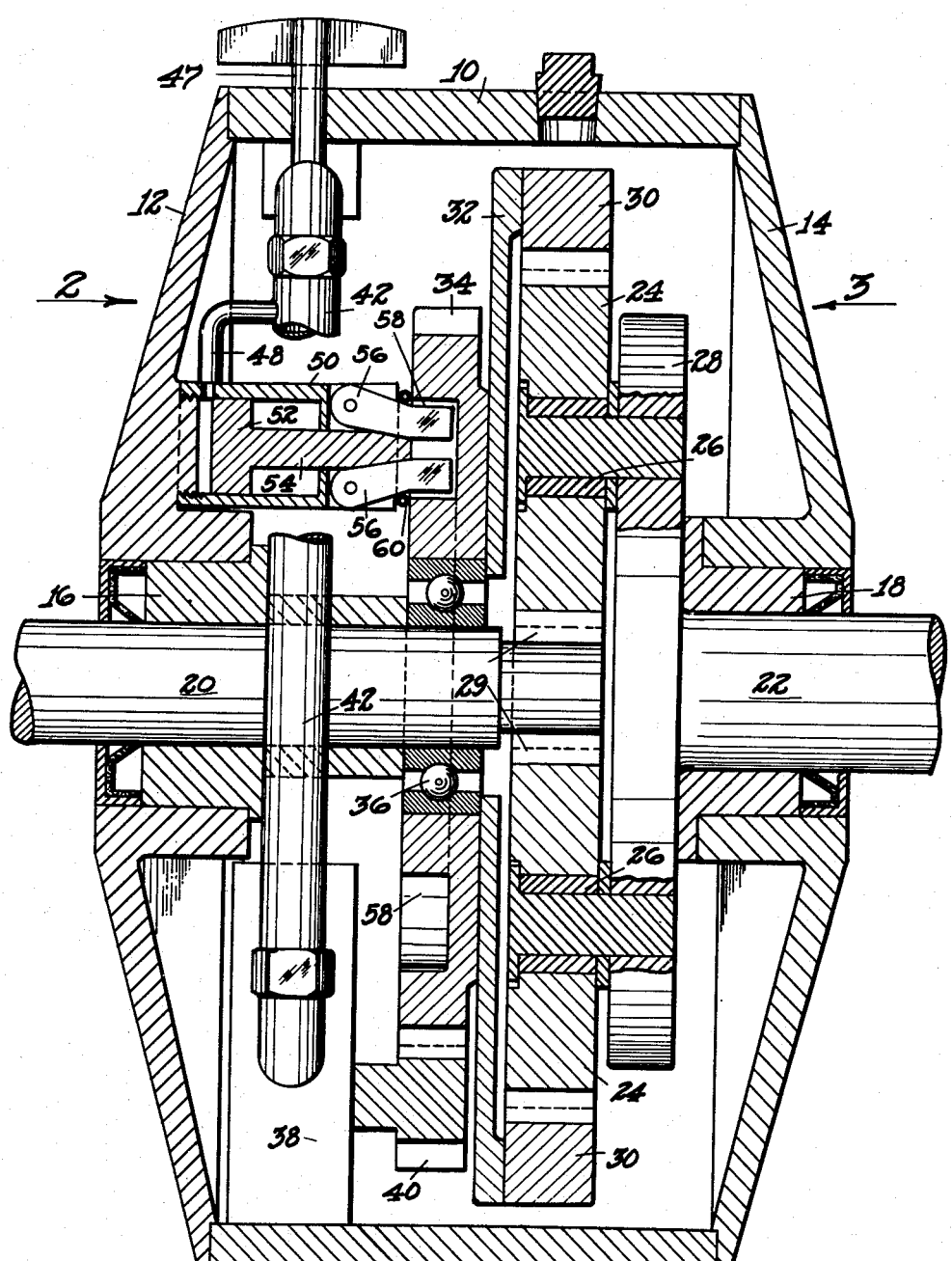
Fig. 1 is a sectional view through the device illustrating the invention.

The reference numeral 10 indicates a housing which may be supported by legs 11 and having end plates 12 and 14 closing the same. Each end plate mounts a central bearing 16 and 18 respectively, journalling a driving shaft 20 in bearing 16 and a driven shaft 22 in bearing 18.

A pair of planetary gears 24 are mounted to freely rotate on bearings 26 at spaced radial points on a plate 28 fast to shaft 22. Gears 24 are in constant engagement with gear teeth 29 on shaft 20 and are also engaged with a ring gear 30. Ring gear 30 has a supporting plate 32 fixed thereto and to a gear 34 mounted to rotate on shaft 20 on bearing 36.

As thus far described gears 24 are rotated on their own axes by shaft 20 in turn rotating ring

2 gear 30, plate 32, and gear 34. It will be clear that if gear 34 is slowed or stopped, gears 24 will start to revolve, and thus drive shaft 22.

Figure 2:
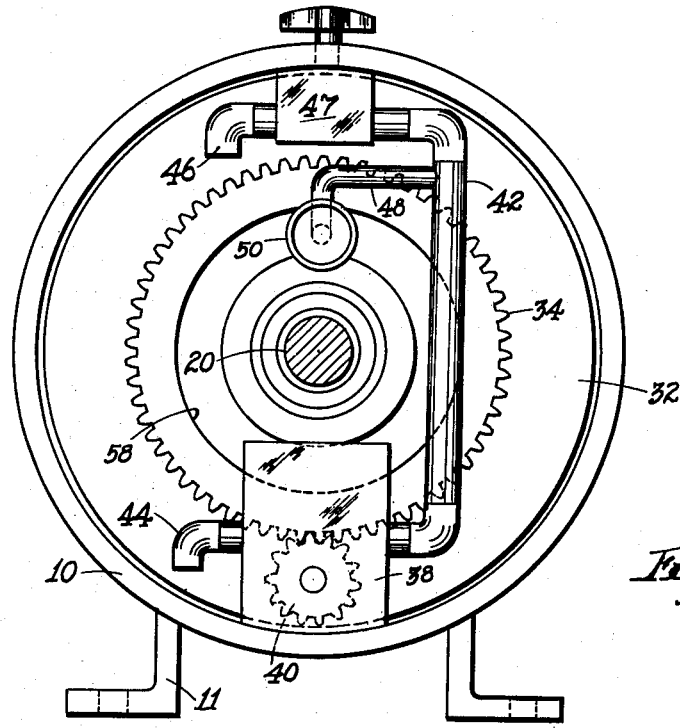
Fig. 2 is a view in side elevation on a reduced scale looking in the direction of arrow 2 in Fig. 1 with a side plate of the housing removed.
Figure 3:
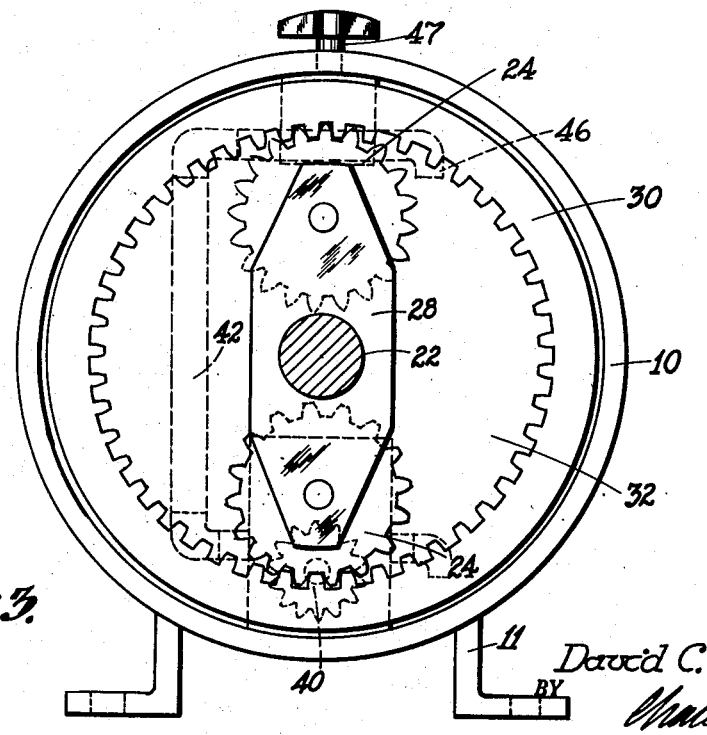
Fig. 3 is a view in elevation looking in the direction of arrow 3 in Fig. 1.

Gear 34 drives a gear 40 connected to operate a pump in a pump housing 38, this pump being of conventional design. A pipe 42 is located entirely within the housing 10 and, as best shown in Fig. 2, is connected to pump housing 38 so that fluid in the housing will be pumped upwardly in the pipe entering at 44 and being freely discharged at 46. Pipe 42 is provided with any kind of valve desired as at 47 for opening and closing the pipe.

As long as valve 47 is open gear 40 constantly pumps fluid through the pipe and shaft 22 will not rotate. However, upon the closing of valve 47 pressure is created in pipe 42 between the pump and the valve, and the pump will decelerate and finally stop. The pump being stopped, gear 34 becomes fixed so that the ring gear 30 will also be fixed forcing gears 24 to revolve and therefore drive shaft 22. The speed of shaft 22 will therefore be governed by valve 47 at any point between zero and maximum speed.

Pipe 42 is provided with a branch 48 leading into a cylinder 50 having a piston 52 and rod 54 thereon. Rod 54 is adapted to separate a pair of pivoted fingers 56 working in an annular channel 58 when pressure is applied to the piston upon closing or partial closing of valve 47. A spring 60 brings the fingers together upon relaxing of pressure in the cylinder when valve 47 is opened.

This construction provides a brake for gear 34 which not only hastens the slowing down of this gear but also provides a means for more positively stopping the same for maximum speed of shaft 22.

Having thus described my invention and the advantages thereof, I do not wish to be limited to the details herein disclosed, otherwise than as set forth in the claims, but what I claim is:

1. Device of the class described comprising a housing, a toothed driving shaft and a driven shaft journalled therein, a gear rotatably mounted on the driving shaft, a ring gear fixed to said gear and supported thereby, planetary gears in mesh with the teeth on the driving shaft, said planetary gears being also in mesh with the ring gear, means journalling the planetary gears in fixed offset radial relation to the driven shaft, a pump, means driving the pump from the first named gear, a housing for the pump, said pump housing having an inlet, a pipe connected to the pump housing and extending adjacent ing in an outlet, a valve adjacent the outlet for controlling the speed of the pump, the latter in turn controlling the speed of the ring gear, a friction brake for the ring gear, a piston movable to actuate the brake, and hydraulic means to actuate the piston, said hydraulic means being connected to the pipe.

2. Device of the class described comprising a housing, driving and driven shafts journalled therein, a gear mounted for rotation on the driving shaft, an annular groove in said gear, a ring gear fixed on and supported by the first named gear, a plate fixed to the driven shaft, planetary gears on the plate meshing with the ring gear and driven by the driving shaft, a pump, a gear connection thereto from said first named gear, a pipe for the pump, said pipe having an inlet and outlet, a valve and a branch pipe between the pump and the outlet, a cylinder, a piston therein, the branch pipe leading into the cylinder, a piston rod, pressure in the pipe being increased by closing the valve, said increased pressure operating the piston and slowing the first named gear and the ring gear, a pair of pivoted fingers having parts thereof in said groove, the piston rod operating to spread the fingers into frictional braking engagement with the walls of the groove.

DAVID C. FERREIRA.

REFERENCES CITED

The following references are of record in the file of this patent:

UNITED STATES PATENTS

| Number | Name | Date |
|---|---|---|
| 2,212,046 | Ross | Aug. 20, 1940 |
| 2,281,384 | Ross | Apr. 28, 1942 |

FOREIGN PATENTS

| Number | Country | Date |
|---|---|---|
| 352,625 | France | Aug. 16, 1905 |